(12) United States Patent
Jagnow et al.

(10) Patent No.: US 11,468,604 B2
(45) Date of Patent: Oct. 11, 2022

(54) METHODS AND SYSTEMS FOR PROVIDING A NOTIFICATION IN ASSOCIATION WITH AN AUGMENTED-REALITY VIEW

(71) Applicant: Google LLC, Mountain View, CA (US)

(72) Inventors: Robert Carl Jagnow, Mountain View, CA (US); Joanna Kim, Mountain View, CA (US); Catherine Most, San Francisco, CA (US); Andre Quang Le, San Francisco, CA (US); Alex Jacobo-Blonder, Fort Lee, NJ (US); Kasey Klimes, San Francisco, CA (US); Dominik Kaeser, New York, NY (US); Rachel Elizabeth Inman, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/451,526

(22) Filed: Jun. 25, 2019

(65) Prior Publication Data

US 2020/0410720 A1 Dec. 31, 2020

(51) Int. Cl.
*G06T 11/00* (2006.01)
*G06T 7/20* (2017.01)
*G08B 21/02* (2006.01)
*H04L 67/55* (2022.01)

(52) U.S. Cl.
CPC ............... *G06T 11/00* (2013.01); *G06T 7/20* (2013.01); *H04L 67/55* (2022.05); *G06T 2210/62* (2013.01); *G08B 21/02* (2013.01)

(58) Field of Classification Search
None
See application file for complete search history.

(56) References Cited

U.S. PATENT DOCUMENTS

| 8,953,841 | B1* | 2/2015 | Leblang | G06K 9/00671 |
| | | | | 382/103 |
| 10,748,427 | B1* | 8/2020 | Aljuaid | G06K 9/00637 |
| 2013/0293586 | A1* | 11/2013 | Kaino | G06T 11/00 |
| | | | | 345/633 |
| 2014/0114575 | A1* | 4/2014 | Alders | G01C 21/3697 |
| | | | | 701/538 |
| 2014/0300466 | A1* | 10/2014 | Park | G08B 19/00 |
| | | | | 340/539.11 |
| 2020/0172010 | A1* | 6/2020 | Kudo | B60Q 5/008 |
| 2020/0258480 | A1* | 8/2020 | Bronder | G09G 5/38 |

FOREIGN PATENT DOCUMENTS

JP 2015088860 A * 5/2015

\* cited by examiner

*Primary Examiner* — Aaron M Richer
(74) *Attorney, Agent, or Firm* — Dority & Manning, P.A.

(57) ABSTRACT

The present disclosure is directed to providing a notification in association with an augmented reality (AR) view. In particular, one or more computing devices can generate, for display by at least one of the computing device(s), an interface depicting an AR view of at least a portion of a physical real-world environment. In accordance with aspects of the disclosure, based at least in part on detected movement of the at least one of the computing device(s), the computing device(s) can transition amongst multiple different stages of one or more elements included in the interface to notify a viewer of the interface to mind their situational awareness of the physical real-world environment.

18 Claims, 6 Drawing Sheets

METHODS AND SYSTEMS FOR PROVIDING A NOTIFICATION IN ASSOCIATION WITH AN AUGMENTED-REALITY VIEW

FIELD

The present disclosure relates generally to augmented reality (AR). More particularly, the present disclosure relates to providing a notification in association with an AR view.

BACKGROUND

Computing devices (e.g., desktop computers, laptop computers, tablet computers, smartphones, wearable computing devices, and/or the like) are ubiquitous in modern society. They can support communications between their users, provide their users with information about their environments, current events, the world at large, and/or the like. A popular use of such devices is generating and displaying augmented reality (AR) views, for example, of at least a portion of a physical real-world environment (e.g., where one or more of such devices is located, and/or the like). An AR view can be part of an interactive AR experience provided to one or more users of such devices, in which such experience is enhanced by computer-generated information perceptible across one or more sensory modalities of the user(s), and/or the like.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include generating, by one or more computing devices and for display by at least one of the computing device(s), an interface depicting an augmented reality (AR) view of at least a portion of a physical real-world environment. The method can also include transitioning, by the computing device(s) and based at least in part on detected movement of the at least one of the computing device(s), amongst multiple different stages of one or more elements included in the interface to notify a viewer of the interface to mind their situational awareness of the physical real-world environment.

Another example aspect of the present disclosure is directed to a system. The system can include one or more processors and a memory storing instructions that when executed by the processor(s) cause the system to perform operations. The operations can include generating, for display by at least one computing device, an interface depicting an AR view of at least a portion of a physical real-world environment. The operations can also include transitioning, based at least in part on detected movement of the at least one computing device, amongst multiple different stages of one or more elements included in the interface to notify a viewer of the interface to mind their situational awareness of the physical real-world environment.

A further example aspect of the present disclosure is directed to one or more non-transitory computer-readable media. The non-transitory computer-readable media can comprise instructions that when executed by one or more computing devices cause the computing device(s) to perform operations. The operations can include generating, for display by at least one of the computing device(s), an interface depicting an AR view of at least a portion of a physical real-world environment. The operations can also include transitioning, based at least in part on detected movement of the at least one of the computing device(s), amongst multiple different stages of one or more elements included in the interface to notify a viewer of the interface to mind their situational awareness of the physical real-world environment.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Example aspects of the present disclosure are directed to providing a notification in association with an augmented reality (AR) view. In particular, a computing system comprising one or more computing devices can generate an interface depicting an AR view for display by at least one of the computing device(s). Such a view can be of at least a portion of a physical real-world environment. For example, a user utilizing one or more of the computing devices can be located near a travelway in an urban environment, one or more sensors (e.g., cameras, and/or the like) of such computing device(s) can generate data representing a view of at least a portion of the urban environment, and the computing device(s) can generate (e.g., based at least in part on the sensor data, map data associated with a geographic location of the computing device(s), and/or the like) an interface depicting an AR view of at least a portion of the urban environment, for example, a view including imagery of a portion of the urban environment (e.g., generated based at least in part on the sensor data, and/or the like), as well as imagery generated based at least in part on the map data associated with the geographic location (e.g., overlaid, overlapping, located within, and/or the like the imagery of the portion of the urban environment, and/or the like). It will be appreciated that in some embodiments, aspects of the disclosure can be implemented with respect to one or more interfaces that fail to comprise an AR view (e.g., one or more interfaces associated with one or more mapping, navigation, communication, and/or the like applications that do not include an AR view, and/or the like).

In accordance with embodiments of the disclosure, based at least in part on detected movement (e.g., associated with a user walking, traveling in a vehicle, and/or the like) of one or more of the computing device(s) (e.g., of the device(s) displaying the AR view, and/or the like), the computing system can transition amongst multiple different stages of one or more elements (e.g., associated with one or more dialogs, warnings, notifications, overlays, and/or the like) included in the interface to notify a viewer of the interface to mind (e.g., by averting their eyes from the displayed interface depicting the AR view, and/or the like) their situational awareness of the physical real-world environment (e.g., for their physical safety, to avoid potential traffic, obstacles, dangers, and/or the like).

In some embodiments, transitioning amongst the stages of the element(s) can include changing whether at least a portion of the element(s) (e.g., associated with a notification dialog, and/or the like) is displayed. Additionally or alternatively, transitioning amongst the stages of the element(s) can include changing transparency, opacity, and/or gradient levels at which at least a portion of the element(s) is displayed (e.g., in order to attract attention of the user, and/or the like). For example, such portion of the element(s) can include at least one element at least partially obscuring the AR view (e.g., to interfere with an experience of the user with respect to the AR view, and/or the like).

In some embodiments, transitioning amongst the stages of the element(s) can include increasing a prominence (e.g., increasingly obstructing at least a portion of the AR view, and/or the like) of at least a portion of the element(s) (e.g., identified using eye-tracking technology, and/or the like) based at least in part on an increase in the detected movement (e.g., as the user moves, the prominence of the notification increases, and/or the like). Additionally or alternatively, transitioning amongst the stages of the element(s) can include reducing a prominence of at least a portion of the element(s) based at least in part on a decrease in the detected movement (e.g., to reduce interference of an experience of the user with respect to the AR view, and/or the like).

In some embodiments, transitioning amongst the stages of the element(s) can include increasing a prominence of at least a portion of the element(s) based at least in part on a duration of the detected movement (e.g., the prominence of such element(s) can increase the longer the user is continuously moving, and/or the like). Additionally or alternatively, transitioning amongst the stages of the element(s) can include reducing a prominence of at least a portion of the element(s) based at least in part on time elapsed since the detected movement (e.g., as the user reduces their movement, the computing system can reduce interference of the experience of the user with respect to the AR view, and/or the like).

In some embodiments, transitioning amongst the stages of the element(s) can include transitioning to a particular stage (e.g., displaying a notification dialog, and/or the like) based at least in part on a determined velocity, distance, elapsed time, and/or the like associated with the detected motion (e.g., the user is at least moving at a predefined speed, and/or the like). In some of such embodiments, transitioning amongst the stages of the element(s) can include transitioning to a different stage of the multiple different stages based at least in part on time elapsed since transitioning to the particular stage (e.g., the user has at least been moving at a predefined speed for at least a predefined period of time, and/or the like).

In some embodiments, transitioning amongst the stages of the element(s) can include transitioning amongst at least a portion of the stages based at least in part on a heuristic value determined based at least in part on determining one or more of starting or stopping of the detected motion (e.g., by a heuristic that takes as input data indicating the detected motion and provides such heuristic value as output, and/or the like). In some of such embodiments, transitioning amongst the at least a portion of the stage(s) can be based at least in part on a current state of a finite-state machine (e.g., a model characterized by its ability to be in only one of a finite number of states at a given time, and/or the like) comprising multiple different and distinct states defined at least in part by one or more thresholds of such heuristic value. In some of such embodiments, the states of the finite-state machine can include one or more states characterized by limited detected movement, sustained detected movement, disregarding detected movement, and/or the like. In some embodiments, transitioning amongst the stages of the element(s) can include transitioning amongst at least a portion of the stages based at least in part on a current state of such finite-state machine, the detected movement, the heuristic value, an elapsed amount of time (e.g., since entering the current state, and/or the like). In some embodiments, transitioning amongst the stages can include providing one or more forms of haptic feedback (e.g., in addition to or in lieu of transitioning amongst the stages of the element(s), and/or the like).

The technology described herein can provide a number of technical effects and benefits. For example, the technology described herein can conserve computing resources (e.g., power resources, processing resources, network resources, and/or the like) by reducing utilization of one or more computing devices, while increasing user safety, and/or the like. For example, in accordance with embodiments of the disclosure, a user may be prompted, encouraged, required, and/or the like to refrain from utilizing their computing device(s) in order to mind their situational awareness within their physical real-world environment, which may reduce utilization of such computing resources, while increasing the user's physical safety, and/or the like.

With reference now to the figures, example embodiments of the present disclosure will be discussed in further detail.

Figure 1:
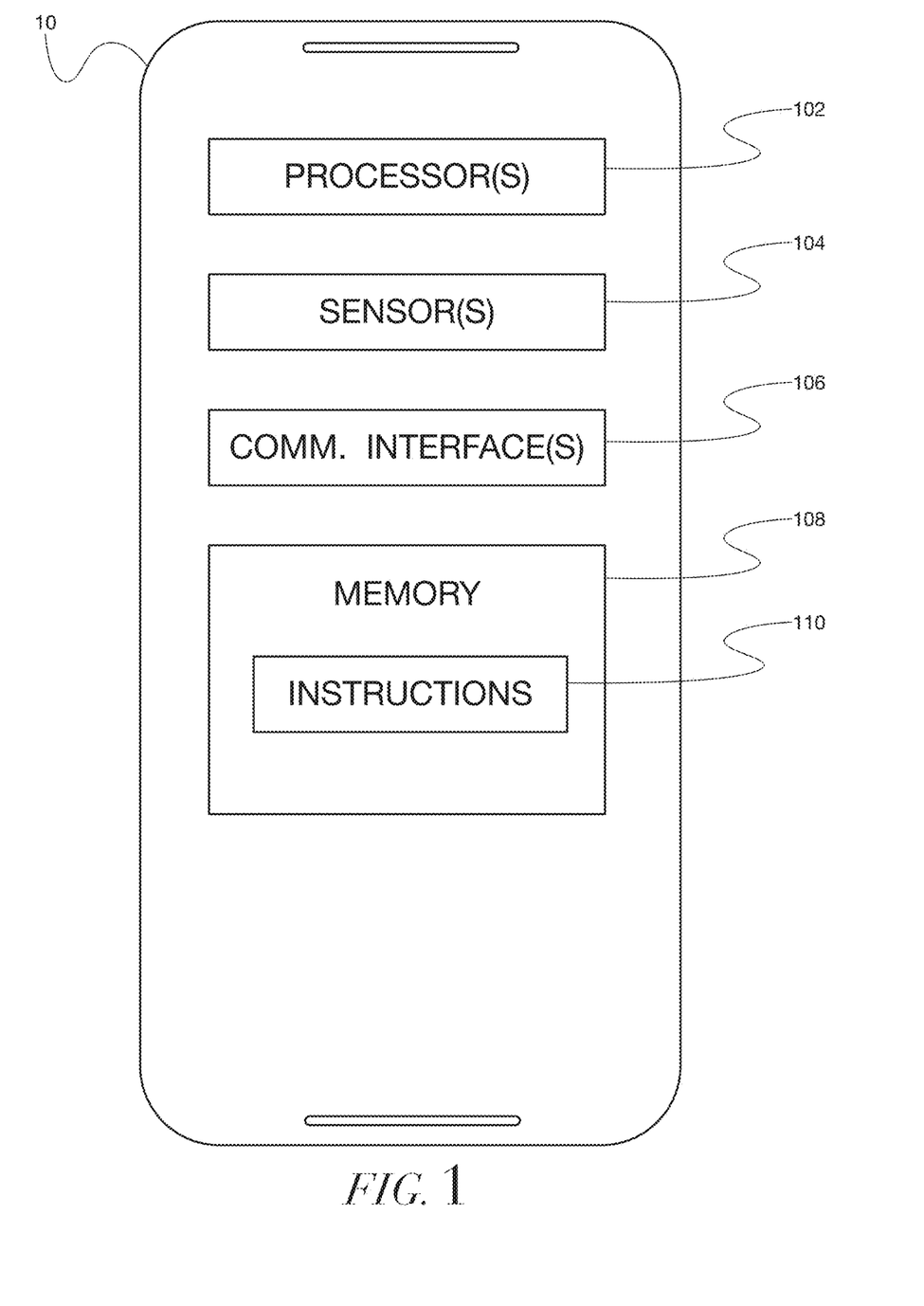
FIG. 1 depicts an example computing device according to example embodiments of the present disclosure.

FIG. 1 depicts an example computing device according to example embodiments of the present disclosure.

Referring to FIG. 1, computing device 10 can include one or more processor(s) 102, one or more sensors 104, one or more communication interfaces 106, and memory 108 (e.g., one or more hardware components for storing executable instructions, data, and/or the like). Sensor(s) 104 can perceive one or more aspects of a physical environment of computing device 10 and can generate data representing the same. For example, sensor(s) 104 can include one or more cameras, global positioning system (GPS) receivers, compasses, altimeters, accelerometers, inertial measurement units (IMUs), microphones, and/or the like. Communication interface(s) 106 can enable computing device 10 to communicate with one or more other computing devices, for example, via one or more networks (e.g., wireless networks, wired networks, and/or the like), channels, sessions, protocols, buses, and/or the like. Memory 108 can include (e.g., store, and/or the like) instructions 110. When executed by processor(s) 102, instructions 110 can cause computing device 10 to perform one or more operations, functions, and/or the like described herein.

It will be appreciated that one or more other computing devices can be associated with computing device 10 (e.g., as part of a computing system, and/or the like), and that one or more of such other computing device(s) can include one or more of the components described above with respect to computing device 10. Irrespective of attribution herein, unless explicitly indicated otherwise, the operations, functions, and/or the like described herein can be performed by computing device 10, one or more of such other computing device(s), and/or one or more combinations of computing device 10 and one or more of such other computing device(s), and/or the like.

Figure 2A:
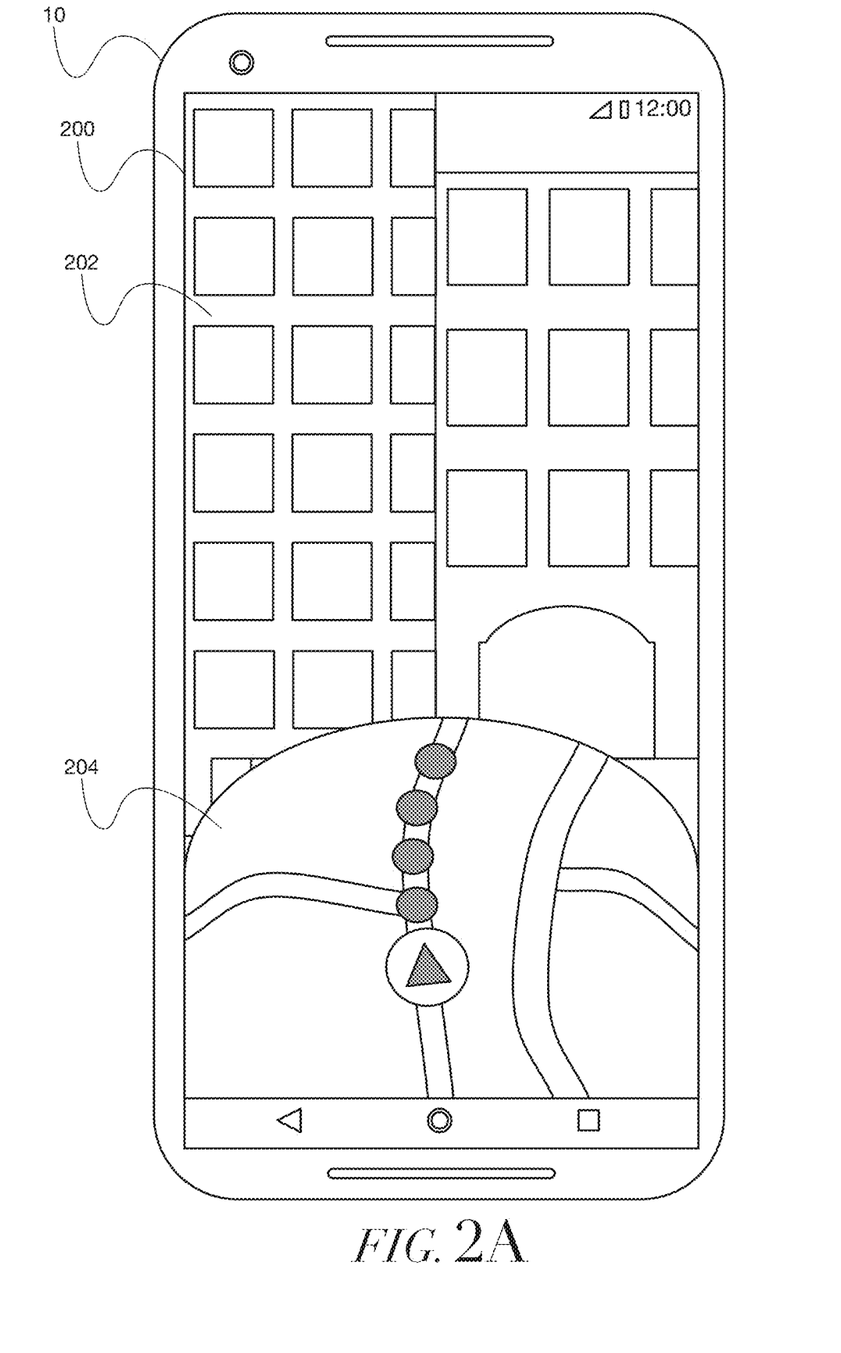
FIGS. 2A-C depict example displayed interfaces according to example embodiments of the present disclosure.

As previously indicated, one or more computing devices can generate an interface depicting an AR view for display by at least one of the computing device(s). For example, referring to FIG. 2A, computing device 10 can generate (e.g., based at least in part on data generated by sensor(s) 104, and/or the like) and display interface 200, which can include an AR view, including portion 202 (e.g., a depiction of a view of at least a portion of a physical real-world environment where computing device 10 is located, and/or the like) and portion 204 (e.g., at least a portion of a map of the location where computing device 10 is located that is aligned, at least in part, with such view, and/or the like).

Computing device 10 can detect (e.g., based at least in part on data generated by sensor(s) 104, and/or the like) movement (e.g., associated with a user walking, traveling in a vehicle, and/or the like) of computing device 10. In accordance with embodiments of the disclosure, based at least in part on such detected movement, computing device 10 can transition amongst multiple different stages of one or more elements (e.g., associated with one or more dialogs, warnings, notifications, overlays, and/or the like) included in interface 200 to notify a viewer of interface 200 to mind (e.g., by averting their eyes from interface 200, and/or the like) their situational awareness of the physical real-world environment (e.g., for their physical safety, to avoid potential traffic, obstacles, dangers, and/or the like). For example, referring to FIG. 2B, responsive to detecting such movement, computing device 10 can transition amongst multiple different stages of element 206, or one or more other elements, and/or the like.

In some embodiments, computing device 10 can detect "forward" movement of computing device 10 by determining a dot product of a detected velocity of computing device 10 and a determined "forward" direction, for example, as determined within the physical real-world environment, for example, based at least in part on data generated by sensor(s) 104 (e.g., imagery from one or more cameras, and/or the like).

Figure 2B:
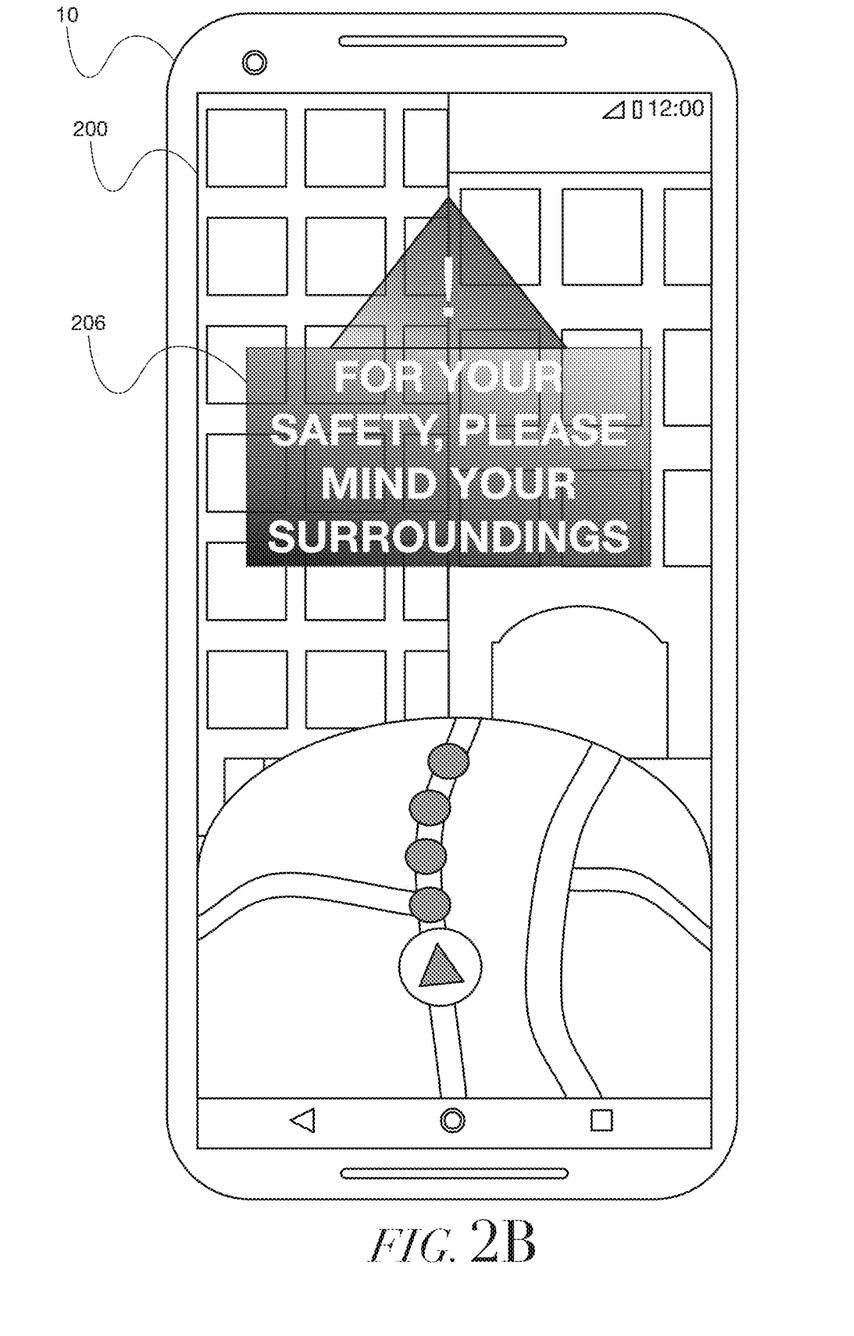

In some embodiments, transitioning amongst the stages of the element(s) can include changing whether at least a portion of the element(s) is displayed. For example, transitioning amongst one or more stages of element 206 can include changing whether at least a portion of element 206 (e.g., associated with a notification dialog, and/or the like) is displayed. Additionally or alternatively, transitioning amongst the stages of the element(s) can include changing transparency, opacity, and/or gradient levels at which at least a portion of the element(s) is displayed (e.g., in order to attract attention of the user, and/or the like). For example, such portion of the element(s) can include at least one element at least partially obscuring the AR view (e.g., to interfere with an experience of the user with respect to the AR view, and/or the like). For example, transitioning amongst one or more stages of element 206 can include changing transparency, opacity, and/or gradient levels at which at least a portion of element 206 is displayed.

In some embodiments, transitioning amongst the stages of the element(s) can include increasing a prominence of at least a portion of the element(s) based at least in part on an increase in detected movement (e.g., as the user moves, the prominence of the notification increases, and/or the like). For example, responsive to detecting an increase in movement, computing device 10 can increase a prominence of at least a portion of element 206. Additionally or alternatively, transitioning amongst the stages of the element(s) can include reducing a prominence of at least a portion of the element(s) based at least in part on a decrease in detected movement (e.g., to reduce interference of an experience of the user with respect to the AR view, and/or the like). For example, responsive to detecting a decrease in movement, computing device 10 can reduce a prominence of at least a portion of element 206.

In some embodiments, transitioning amongst the stages of the element(s) can include increasing a prominence of at least a portion of the element(s) based at least in part on a duration of detected movement (e.g., the prominence of such element(s) can increase the longer the user is continuously moving, and/or the like). For example, responsive to an increase in duration of detected movement, computing device 10 can increase a prominence of at least a portion of element 206. Additionally or alternatively, transitioning amongst the stages of the element(s) can include reducing a prominence of at least a portion of the element(s) based at least in part on time elapsed since detected movement (e.g., as the user reduces their movement, the computing system can reduce interference of the experience of the user with respect to the AR view, and/or the like). For example, responsive to time elapsed since detected movement, computing device 10 can reduce a prominence of at least a portion of element 206.

Figure 2C:
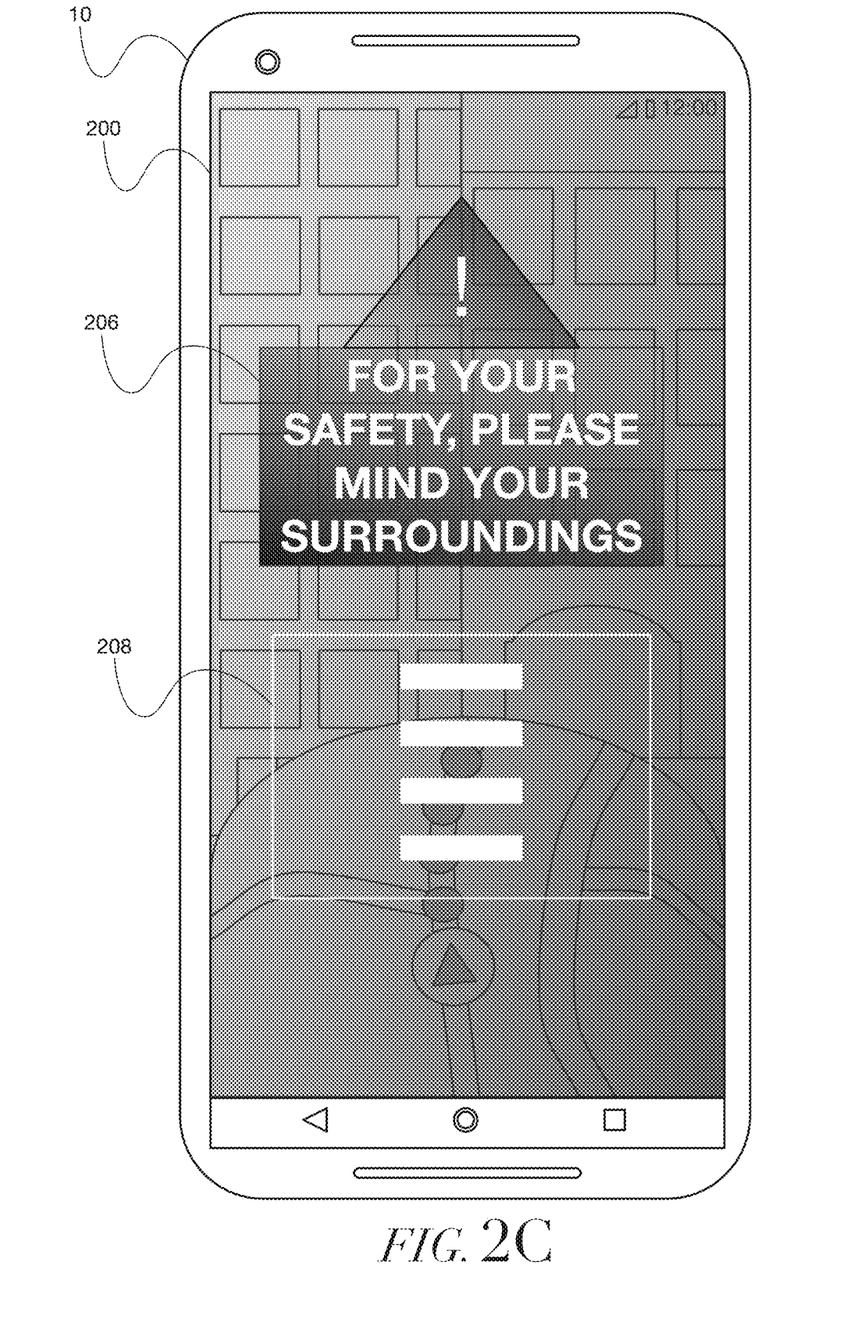

In some embodiments, transitioning amongst the stages of the element(s) can include transitioning to a particular stage (e.g., displaying a notification dialog, and/or the like) based at least in part on a determined velocity associated with detected motion (e.g., the user is at least moving at a predefined speed, and/or the like). For example, responsive to detecting a determined velocity, computing device 10 can transition to a stage in which element 206 is at least partially displayed. In some of such embodiments, transitioning amongst the stages of the element(s) can include transitioning to a different stage of the multiple different stages based at least in part on time elapsed since transitioning to the particular stage (e.g., the user has at least been moving at a predefined speed for at least a predefined period of time, and/or the like). For example, referring to FIG. 2C, responsive to time elapsed since element 206 was at least partially displayed, computing device 10 can transition to a stage in which element 208 is at least partially displayed (e.g., at least partially obstructing a view of at least a portion of interface 200, indicting the user is approaching a crosswalk, and/or the like).

In some embodiments, transitioning amongst the stages of the element(s) can include transitioning amongst at least a portion of the stages based at least in part on a heuristic value determined based at least in part on determining one or more of starting or stopping of the detected motion. In some of such embodiments, transitioning amongst the at least a portion of the stage(s) can be based at least in part on a current state of a finite-state machine comprising multiple different and distinct states defined at least in part by one or more thresholds of such heuristic value. For example, FIG. 3 depicts example state transitions according to example embodiments of the present disclosure.

Figure 3:
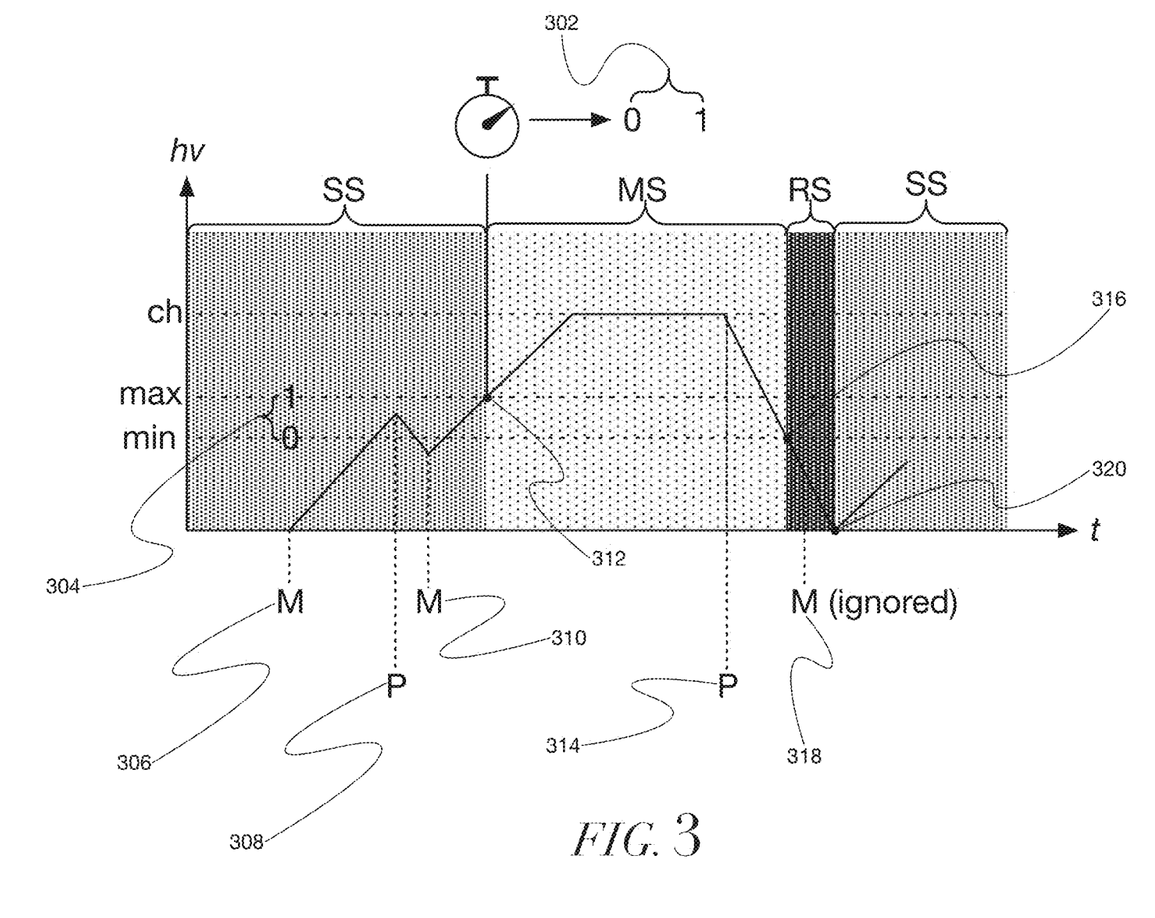
FIG. 3 depicts example state transitions according to example embodiments of the present disclosure.

Referring to FIG. 3, a predetermined velocity (e.g., for walking, 0.4 m/s, and/or the like) can correspond to a threshold at which detected movement is considered to indicate a user is moving. When detected velocity is above such threshold, the heuristic value (hv) can increase (e.g., at a predetermined heuristic velocity). For example, at (306) (e.g., of time (t), and/or the like), the system can be in a state characterized by limited detected movement (e.g., stationary state (SS), and/or the like) and computing device 10 can detect movement exceeding such threshold, and the heuristic value can increase at such a heuristic velocity, and/or the like. In accordance with embodiments of the disclosure, when the heuristic value reaches a predetermined minimum value (e.g., min, and/or the like), computing device 10 can transition amongst multiple different stages within range 304 (e.g., by changing one or more transparency, opacity, and/or gradient levels, and/or the like) of one or more elements (e.g., element 206, and/or the like) of interface 200 (e.g., to increase their prominence, and/or the like).

At (308), responsive to detecting movement below a predetermined velocity (e.g., for walking, 0.3 m/s, and/or the like) corresponding to a threshold at which detected movement is considered to indicate a user is stationary, computing device 10 can decrease the heuristic value (e.g., at a predetermined "cooldown" heuristic velocity, and/or the like). In accordance with embodiments of the disclosure, as the heuristic value decreases, computing device 10 can transition amongst multiple different stages within range 304 (e.g., by changing one or more transparency, opacity, and/or gradient levels, and/or the like) of one or more elements (e.g., element 206, and/or the like) of interface 200 (e.g., to decrease their prominence, and/or the like).

At (310), computing device 10 can again detect movement exceeding the threshold at which detected movement is considered to indicate the user is moving, the heuristic value can increase at the heuristic velocity, and when the heuristic value reaches a predetermined minimum value (e.g., min, and/or the like), computing device 10 can transition amongst multiple different stages within range 304 (e.g., by changing one or more transparency, opacity, and/or gradient levels, and/or the like) of one or more elements (e.g., element 206, and/or the like) of interface 200 (e.g., to increase their prominence, and/or the like).

At (312), the heuristic value can reach a predetermined maximum value (e.g., max, and/or the like), and the system can transition to a state characterized by sustained detected movement (e.g., moving state (MS), and/or the like), which can trigger a timer. As the heuristic value continues to increase it can reach a predetermined clamp value (e.g., ch, and/or the like) corresponding to the maximum value allowed, and/or the like. Moreover, in accordance with embodiments of the disclosure, as time since transitioning into the state characterized by sustained movement elapses (e.g., as measured by the timer, and/or the like), computing device 10 can transition amongst multiple different stages within range 302 (e.g., by changing one or more transparency, opacity, and/or gradient levels, and/or the like) of one or more elements (e.g., element 208, and/or the like) of interface 200 (e.g., to increase their prominence, and/or the like).

At (314), responsive to detecting movement below the predetermined velocity corresponding to the threshold at which detected movement is considered to indicate the user is stationary, computing device 10 can decrease the heuristic value (e.g., at the predetermined "cooldown" heuristic velocity, and/or the like).

At (316), responsive to the heuristic value reaching the predetermined minimum value (e.g., min, and/or the like), the system can transition to a state characterized by disregarding detected movement (e.g., resetting state (RS), and/or the like), in which movement at (318) can be disregarded (e.g., fail to increase the heuristic value, and/or the like), and in accordance with embodiments of the disclosure, computing device 10 can transition (e.g., at a predetermined rate, and/or the like) amongst multiple different stages within ranges 302 and/or 304 (e.g., by changing one or more transparency, opacity, and/or gradient levels, and/or the like) of one or more elements (e.g., elements 206, 208, and/or the like) of interface 200 (e.g., to decrease their prominence, and/or the like).

At (320), the heuristic value can return to its base level, and responsive to computing device 10 once again detecting movement exceeding the threshold at which detected movement is considered to indicate the user is moving, the system can return to the state characterized by limited detected movement (e.g., the stationary state (SS), and/or the like), and the heuristic value can increase at the heuristic velocity.

Figure 4:
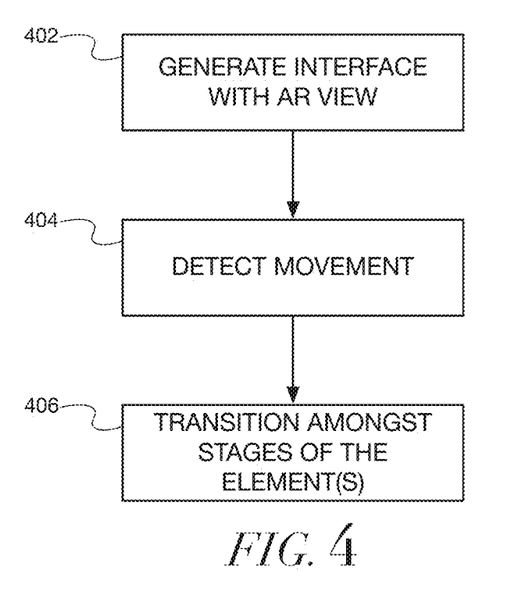
FIG. 4 depicts an example method according to example embodiments of the present disclosure.

FIG. 4 depicts an example method according to example embodiments of the present disclosure.

Referring to FIG. 4, at (402), one or more computing devices can generate, for display by at least one of the computing device(s), an interface depicting an AR view of at least a portion of a physical real-world environment. For example, computing device 10 can generate and display interface 200, and/or the like.

At (404), the computing device(s) can detect movement of the at least one of the computing device(s). For example, computing device 10 can (e.g., based at least in part on data generated by sensor(s) 104, and/or the like) detect movement (e.g., of itself, its associated user, and/or the like).

At (406), based at least in part on such detected movement, the computing device(s) can transition amongst multiple different stages of one or more elements included in the interface to notify a viewer of the interface to mind their situational awareness of the physical real-world environment. For example, responsive to detecting movement, computing device 10 can transition amongst multiple different stages of elements 206 and/or 208.

The technology discussed herein refers to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), and/or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one of ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a further embodiment. Thus, it is intended that the present disclosure cover such alterations, variations, and/or equivalents.

What is claimed is:

1. A computer-implemented method comprising:
generating, by a computing device and for display by the computing device, an interface depicting an augmented reality (AR) view of at least a portion of a physical real-world environment, the AR view including one or more displayed augmented reality elements;
determining, by the computing device, a velocity of the computing device;
generating, by the computing device, a heuristic value based on the determined velocity, wherein the heuristic value increases at a heuristic velocity different from the determined velocity and decreases at a cooldown velocity different from the determined velocity;
determining, by the computing device, that the heuristic value has increased to exceed a heuristic threshold, wherein the heuristic value increases at the heuristic velocity when the determined velocity exceeds an upper velocity threshold and the heuristic value decreases at the cooldown velocity when the determined velocity is below a lower velocity, threshold; and
in response to determining that the heuristic value has increased to exceed the heuristic threshold, providing, by the computing device, one or more notifications to a viewer of the interface by transitioning an augmented reality element in the one or more displayed augmented reality elements that was displayed in the AR view prior to determining that the heuristic value exceeds the heuristic threshold for a predetermined period of time from a first stage to a second stage to notify a viewer of the interface to mind their situational awareness of the physical real-world environment.

2. The computer-implemented method of claim 1, wherein transitioning the augmented reality element in the one or more displayed augmented reality elements that was displayed in the AR view prior to determining that the heuristic value has increased to exceed the heuristic threshold from a first stage to a second stage comprises changing whether at least a portion of the augmented reality element is displayed.

3. The computer-implemented method of claim 1, wherein transitioning the augmented reality element in the one or more displayed augmented reality elements that was displayed in the AR view prior to determining that the heuristic value has increased to exceed the heuristic threshold from a first stage to a second stage comprises changing one or more transparency, opacity, or gradient levels at which at least a portion of the augmented reality element is displayed.

4. The computer-implemented method of claim 3, wherein the at least a portion of the augmented reality element is at least partially obscuring the AR view.

5. The computer-implemented method of claim 1, wherein transitioning the augmented reality element in the one or more displayed augmented reality elements that was displayed in the AR view prior to determining that the heuristic value has increased to exceed the heuristic threshold from a first stage to a second stage comprises increasing a prominence of at least a portion of the augmented reality element based at least in part on an increase in the heuristic value.

6. The computer-implemented method of claim 1, wherein transitioning the augmented reality element in the one or more displayed augmented reality elements that was displayed in the AR view prior to determining that the heuristic value has increased to exceed the heuristic threshold from a first stage to a second stage comprises reducing a prominence of at least a portion of the augmented reality element based at least in part on a decrease in the heuristic value.

7. The computer-implemented method of claim 1, wherein transitioning the augmented reality element in the one or more displayed augmented reality elements that was displayed in the AR view prior to determining that the heuristic value has increased to exceed the heuristic threshold a first stage to a second stage comprises increasing a prominence of at least a portion of the augmented reality element based at least in part on a duration of time during which the heuristic value exceeded the heuristic threshold.

8. The computer-implemented method of claim 1, wherein transitioning the augmented reality element in the one or more displayed augmented reality elements that was displayed in the AR view prior to determining that the heuristic value has increased to exceed the heuristic threshold from a first stage to a second stage comprises reducing a prominence of at least a portion of the augmented reality element based at least in part on time elapsed since the heuristic value increased to exceed the heuristic threshold.

9. The computer-implemented method of claim 1, wherein transitioning the augmented reality element in the one or more displayed augmented reality elements that was displayed in the AR view prior to determining that the heuristic value has increased to exceed the heuristic threshold from a first stage to a second stage comprises transitioning to a first stage of multiple different stages based at least in part on a determined velocity associated with the heuristic value.

10. The computer-implemented method of claim 9, wherein transitioning the augmented reality element in the one or more displayed augmented reality elements that was displayed in the AR view prior to determining that the heuristic value has increased to exceed the heuristic threshold from a first stage to a second stage comprises transitioning to the second stage of the multiple different stages based at least in part on time elapsed since transitioning to the first stage.

11. The computer-implemented method of claim 1, wherein transitioning the augmented reality element in the one or more displayed augmented reality elements that was displayed in the AR view prior to determining that the heuristic value has increased to exceed the heuristic threshold from a first stage to a second stage comprises transitioning amongst the at least a portion of multiple different stages based at least in part on a current state of a finite-state machine comprising multiple different and distinct states defined at least in part by one or more thresholds of the heuristic value.

12. The computer-implemented method of claim 11, wherein the multiple different and distinct states include a state characterized by limited detected movement.

13. The computer-implemented method of claim 11, wherein the multiple different and distinct states include a state characterized by disregarding detected movement.

14. A system comprising:
one or more processors; and
a memory storing instructions that when executed by the one or more processors cause the system to perform operations comprising:
generating, for display by at least one computing device, an interface depicting an augmented reality (AR) view of at least a portion of a physical real-world environment, the AR view including one or more displayed augmented reality elements;
determining a velocity of the computing device;
generating a heuristic value based on the determined velocity, wherein the heuristic value increases at a heuristic velocity different from the determined velocity and decreases at a cooldown velocity, different from the determined velocity;
determining that the heuristic value has increased to exceed a heuristic threshold, wherein the heuristic value increases at the heuristic velocity when the determined velocity exceeds an upper velocity threshold and the heuristic value decreases at the cooldown velocity when the determined velocity is below a lower velocity threshold; and
in response to determining that the heuristic value has increased to exceed the heuristic threshold, providing one or more notifications to a viewer of the interface by transitioning an augmented reality element in the one or more displayed augmented reality elements that was displayed in the AR view prior to determining that the heuristic value exceeds the heuristic threshold from a first stage to a second stage to notify a viewer of the interface to mind their situational awareness of the physical real-world environment.

15. The system of claim 14, wherein transitioning the augmented reality element in the one or more displayed augmented reality elements that was displayed in the AR view prior to determining that the heuristic value has increased to exceed the heuristic threshold from a first stage to a second stage comprises changing whether at least a portion of the augmented reality element is displayed.

16. The system of claim 14, wherein transitioning the augmented reality element in the one or more displayed augmented reality elements that was displayed in the AR view prior to determining that the heuristic value has increased to exceed the heuristic threshold from a first stage to a second stage comprises changing one or more transparency, opacity, or gradient levels at which at least a portion of the augmented reality element are displayed.

17. The system of claim 16, wherein the at least a portion of the augmented reality element is at least partially obscuring the AR view.

18. One or more non-transitory computer-readable media comprising instructions that when executed by one or more computing devices cause the one or more computing devices to perform operations comprising:
generating, for display by at least one of the one or more computing devices, an interface depicting an augmented reality (AR) view of at least a portion of a physical real-world environment, the AR view including one or more displayed augmented reality elements;
determining, by the computing device; a velocity of the computing device;
generating, by the computing device, a heuristic value based on the determined velocity; wherein the heuristic value increases at a heuristic velocity different from the determined velocity and decreases at a cooldown velocity different from the determined velocity;
determining that the heuristic value has increased to exceed a heuristic threshold, wherein the heuristic value increases at the heuristic velocity when the determined velocity exceeds an upper velocity threshold and the heuristic value decreases at the cooldown velocity when the determined velocity is below a lower velocity threshold; and
in response to determining that the heuristic value has increased to exceed the heuristic threshold, providing one or more notifications to a viewer of the interface by transitioning an augmented reality element in the one or more displayed augmented reality elements that was displayed in the AR view prior to determining that the heuristic value exceeds the heuristic threshold from a first stage to a second stage to notify a viewer of the interface to mind their situational awareness of the physical real-world environment.

* * * * *